Jan. 2, 1945.  H. T. LAMBERT  2,366,412
VALVE CONSTRUCTION
Filed Oct. 31, 1941
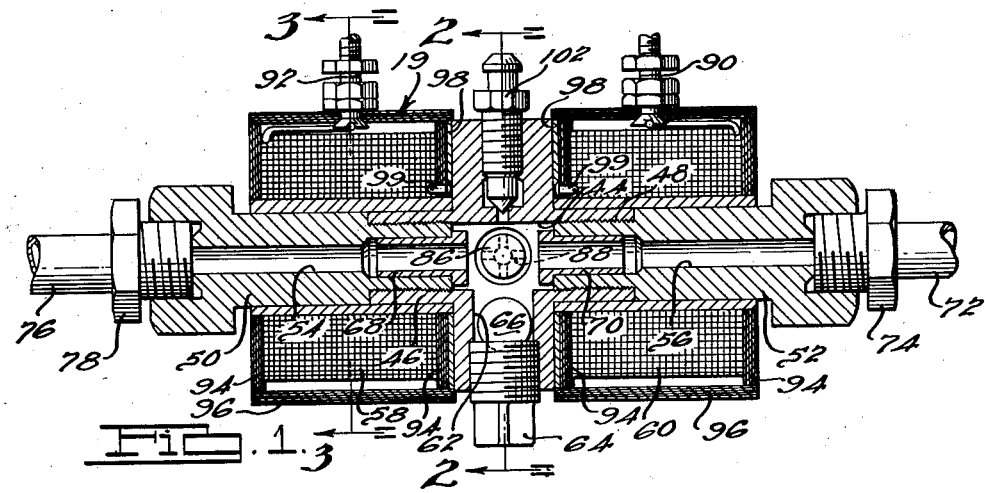
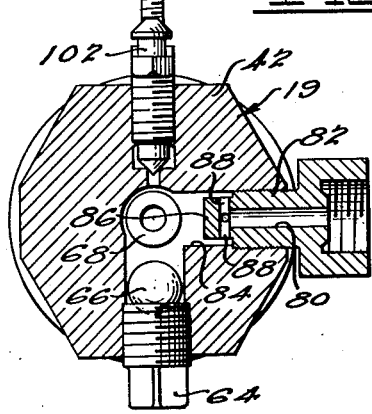
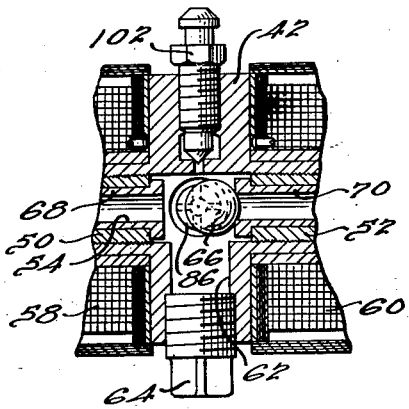
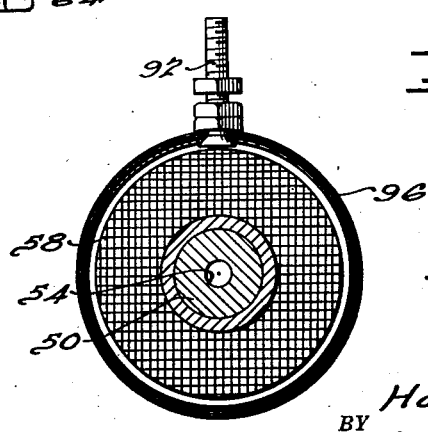
INVENTOR
*Homer T. Lambert.*
BY *Harness, Dickey & Pierce.*
ATTORNEYS Patented Jan. 2, 1945

2,366,412

UNITED STATES PATENT OFFICE 2,366,412

VALVE CONSTRUCTION

Homer T. Lambert, St. Joseph, Mich., assignor to The Lambert Brake Corporation, St. Joseph, Mich., a corporation of Michigan Application October 31, 1941, Serial No. 417,309

2 Claims. (Cl. 137—139)

The present invention relates to a valve construction, and particularly relates to improvements in magnetic valve structures.

One of the primary objects is to provide improvements in valve structures of the type mentioned which may operate under high pressures, for example, up to 1000 pounds per square inch, without leakage.

Another object of the invention is to provide an improved and simplified valve structure of the type mentioned which is economical to manufacture and which has a single movable operating part.

Another object of the invention is to provide improvement in a valve of the type mentioned which is positive in its action in both seating and unseating the valve element.

Other objects of the invention will become apparent from the following specification, the drawing relating thereto, and the claims hereinafter set forth.

In the drawing, in which like numerals are used to designate like parts throughout;

Figure 1 is a cross-sectional view through a valve embodying features of the present invention;

Fig. 2 is a cross-sectional view taken substantially along the line 2—2 of Fig. 1;

Fig. 3 is a cross-sectional view taken substantially along the line 3—3 of Fig. 1; and, Fig. 4 is a partial view, similar to Fig. 1, and showing one of the valve elements in a different position from that shown in Fig. 1.

One of the forms of the present invention has particular utility when used in an hydraulic braking system such as that disclosed and claimed in the copending application of Homer T. Lambert, Serial No. 417,308, filed concurrently herewith. However, the valves of the present invention have utility in other fields as well. For example, such valves may be used for high speed industrial machines and machinery when it becomes necessary to change the flow of hydraulic pressure from one operation to another by simply actuating an electric switch. In such use there may be a central distribution point from which there would be several fluid pressure lines operating many machines. The electromagnetic valves of the present type may then be used to shut off pressure for any particular line and from a remote control.

Referring to the drawing, and referring particularly to Figs. 1 to 4 thereof, one embodiment of the present invention is illustrated in which a valve, generally indicated at 19, is shown. Such valve 19 is of the electromagnetic type and includes a non-magnetic valve body portion 42, which may be made from brass, or other suitable metal that will not be affected by magnetic torque or magnetic attraction. The body portion 42 is formed with a transverse bore 44 having tubular projecting portions 46 and 48 which are internally threaded. Steel cores 50 and 52, having reduced and threaded inner ends, are threadably received within the projections 46 and 48, respectively. The cores 50 and 52 are tubular in form, thus providing longitudinally extending channels or conduits 54 and 56, respectively, therethrough. Such cores are the cores for the electric coils 58 and 60, respectively, which are wound in the usual manner and disposed at the sides of the valve body portion 42 in embracing and surrounding relation to the core members 50 and 52. The cores 50 and 52 may be formed from any metal that will become highly magnetized when a current of electricity passes through the coils 58 and 60.

The valve body 42 is provided with a downwardly directing portion forming a valve chamber 62. A metal plug 64, which is formed of brass or other non-magnetic material, is threadably received within the body portion 42 for providing access to the chamber 62 so that a metal ball valve 66 may be disposed therein which is adapted to set upon a depressed portion formed in the inner surface of the plug 64. The ball 66 is formed from a suitable magnetic metal to have the highest magnetic attraction obtainable. This ball will rest in its seat in the lower portion of the chamber 62, being held there by gravity until an electric current is produced in either one of the coils 58 and 60, at which time the corresponding core 50 or 52 is magnetized to attract the ball over the end of the corresponding core, thus blocking the passage into conduit 54 or 56, depending of course upon which coil is energized.

Non-magnetic, metal, tubular bushings 68 and 70, which are relatively thin, are pressed into the inner ends of the cores 50 and 52, respectively, so as to prevent the metal ball from adhering to or sticking to its seat with respect to the cores 50 and 52. This is a safety measure in order to insure proper and positive action of the valve in that the cores 50 or 52 and the ball 66 may retain a portion of the magnetism and the ball would then not release or disengage itself from that core to which it was attracted. With the thin portions of the non-magnetic members 68 and 70, the ball will drop as soon as the electric current is disconnected or the circuit is broken.

A tubular fluid pressure conduit 72 is connected to the hexhead end of the core 52 through a tube nut 74 so that the tubular conduit is in registry with the conduit 56. Such conduit 72 leads to and provides the pressure line connected to a suitable operating element. A similar fluid conduit 76 is connected to the core 50 by a tube nut 78 in communication with the conduit 54 and leads to another operating element.

A fluid under pressure from a suitable source is conducted into the interior of the valve 19 through an inlet channel 80 formed in an inlet plug 82 formed from a non-magnetic metal. Such plug 82 is received within a tapped opening provided in the valve body 42 and communicates with an inlet chamber 84 which is located centrally of the valve body between the inner ends of the cores 50 and 52. Such member 82 is threadably fastened to the end of a conduit or the like leading to the source of supply.

The outlet end of the member 82 is so formed as to check the fluid pressure entering the core of the member 42 just enough to prevent the metal ball 66 from lifting by the force of the fluid and to prevent a straight flow of fluid and spread it against the side walls of the valve body. This prevents swirling of the fluid under high velocity and thereby prevents any agitation of the ball 66 under pressure. To accomplish this the inner end 86 of the valve body is of reduced diameter with respect to the diameter of the chamber 84 and is provided with a plurality of transversely extending apertures 88 which are drilled crosswise of the inner end. Thus the fluid under pressure entering through conduit 80 strikes against the baffle end 86 and is diverted radially outwardly through apertures 88 into the space between the small end of the plug and the wall of the chamber 84.

With the ball in the position shown in 66 and without energizing either of the coils 58 and 60, it will be seen that when the fluid under pressure enters through conduit 80 such fluid under pressure passes through both of the conduits 54 and 56 to the pressure lines 76 and 72, respectively. However, when it is desired to block flow through one of the lines, means are provided for energizing one of the coils so that fluid to one of the lines is blocked off and the other line only will be acted upon by the fluid pressure.

Such means includes a terminal post 90 which is electrically connected to the coil 60, and another terminal post 92 which is electrically connected to the coil 58. Suitable fastener nuts are associated with the posts 90 and 92 for fastening wire connections thereto.

Each of the coils or spools 58 and 60 is provided with end insulating flanges 94 having cylindrical insulating covers 96 associated therewith so that the coils are encased within insulation.

In order to form the ground for the coils 58 and 60, brass washers 98 are interposed between the inner insulating members 94 and the valve body portion 42. The coils 58 and 60 are electrically connected to the grounds 98 by means of metal, electrical conducting members 99 which project through the inner insulating members 94. Suitable ground wires are connected to the members 98 and are suitably grounded.

An air vent plug 102 is provided in an air vent passageway formed in the body 42 which communicates with the inner chambers thereof for bleeding air from the valve and from all of the connecting fluid lines in order to provide for proper operation of the fluid brakes.

What is claimed is:

1. An electromagnetic valve comprising a valve housing having an interior chamber, means providing an inlet into said chamber, means providing a plurality of outlets from said chamber, said last-named means including a plurality of magnetizable conduit members, a magnetically attracted ball valve element movably disposed within said chamber and movable toward either of said conduit members to block flow therethrough, means to selectively magnetize said conduit members, and a relatively thin non-magnetizable element disposed between each of said conduit members and said element when said element is attracted to either of said conduit members.

2. An electromagnetic valve comprising a valve housing having an interior chamber, means providing an inlet into said chamber, means providing a plurality of outlets from said chamber, said last-named means including a plurality of magnetizable conduit members, a magnetically attracted ball valve element movably disposed within said chamber and movable toward either of said conduit members to block flow therethrough, means to selectively magnetize said conduit members, and a relatively thin non-magnetizable element secured to the inner end of each of said conduit members and adapted to be engaged by said valve element when said valve element is attracted to either of said conduit members.

HOMER T. LAMBERT.